United States Patent
Salvarani et al.

(10) Patent No.: US 6,606,496 B1
(45) Date of Patent: Aug. 12, 2003

(54) REVERSE LINK OTHER CELL INTERFERENCE LOCATOR AND HANDOFF TRIGGER FOR WIRELESS NETWORK

(75) Inventors: Alexandro Salvarani, Edison, NJ (US); Carl F. Weaver, Township of Hanover, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 368 days.

(21) Appl. No.: 09/645,546

(22) Filed: Aug. 25, 2000

(51) Int. Cl.[7] .............................. H04Q 7/20; H04Q 7/38; H04B 7/15

(52) U.S. Cl. ........................ 455/436; 455/63; 455/67.3; 370/331; 375/144

(58) Field of Search ................................ 455/436, 438, 455/439, 63, 67.3, 454, 442, 453, 450, 446, 67.1; 375/144, 148, 224, 346, 348; 370/315, 331, 332, 333, 335; 380/48

(56) References Cited

U.S. PATENT DOCUMENTS

| | | | |
|---|---|---|---|
| 5,081,679 A | * 1/1992 | Dent | 380/272 |
| 5,530,917 A | * 6/1996 | Andersson et al. | 455/436 |
| 5,666,356 A | 9/1997 | Fleming | |
| 5,796,722 A | 8/1998 | Kotzin | |
| 5,878,350 A | * 3/1999 | Nakamura et al. | 455/442 |
| 5,920,817 A | * 7/1999 | Umeda et al. | 455/437 |
| 6,097,947 A | 8/2000 | Takai | |
| 6,163,696 A | * 12/2000 | Bi et al. | 455/436 |
| 6,198,910 B1 | * 3/2001 | Hanley | 455/67.1 |
| 6,353,729 B1 | * 3/2002 | Bassirat | 455/11.1 |
| 2001/0053695 A1 | * 12/2001 | Wallentin | 455/436 |

FOREIGN PATENT DOCUMENTS

WO 99/26360 5/1999

OTHER PUBLICATIONS

European Search Report 01305945.6, Jan. 4, 2002.

* cited by examiner

Primary Examiner—Nguyen T. Vo
Assistant Examiner—Kamran Afshar

(57) ABSTRACT

A method/apparatus identifies other cell interference in a wireless network and determines whether a handoff to an affected base station should occur. In one implementation, a base station of a CDMA-based wireless network continuously monitors reverse link interference levels to detect an increased interference condition, and initiates a CDMA mobile identifying sequence to determine whether the interfering signal source is a proximate mobile being served by a neighboring base station of the network. The affected base station obtains a list of long code masks for mobiles being served by neighboring base stations, and instructs at least one receiver unit to sequentially despread received signals using each of the listed long code masks. When the receiver unit detects a signal transmitted by a non-served mobile, the base station analyzes relative reverse link signal strength for the non-served mobile, e.g., using Ec/Io measurements, to determine whether the non-served mobile is likely be the source of interference. Having determined that a nearby CDMA mobile is the source of interference, the affected base station may initiate one of a number of possible actions, including triggering a handoff to the affected base station so that the affected base station could control the transmit power level of the mobile, requesting that the interfering mobile be switched to a different frequency carrier or dropped, or merely recording the interference condition.

31 Claims, 3 Drawing Sheets

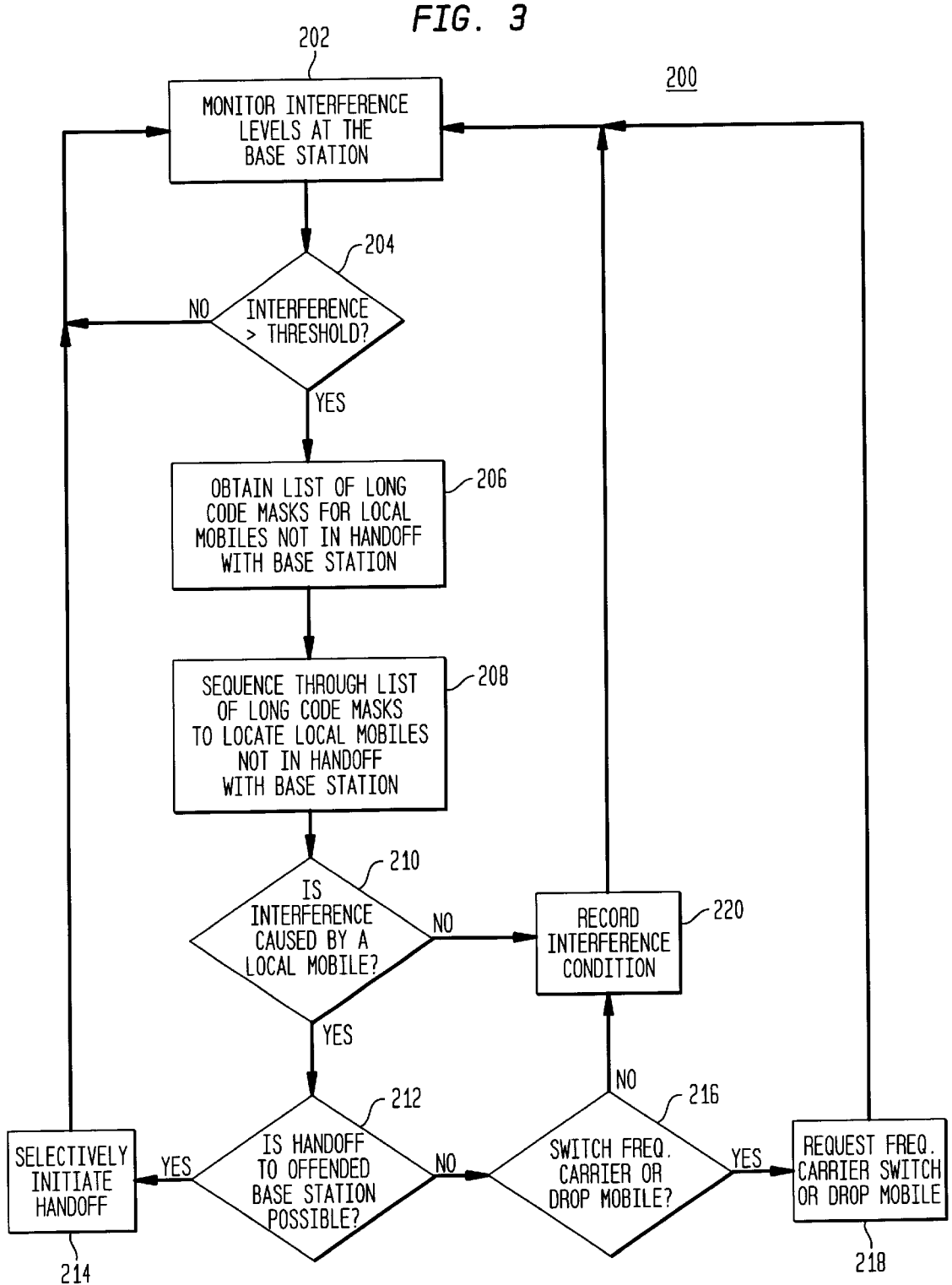

REVERSE LINK OTHER CELL INTERFERENCE LOCATOR AND HANDOFF TRIGGER FOR WIRELESS NETWORK

BACKGROUND OF THE INVENTION

1. Field of the Invention

The present invention relates to wireless communications, and more particularly to a method and an apparatus for identifying an interference source in a wireless network.

2. Description of Related Art

Wireless communication networks which utilize spread spectrum digital modulation techniques, such as the Code Division Multiple Access (CDMA) system specified in the IS-95 Standard of the U.S. Telecommunication Industry Association (TIA), form a plurality of channels from the same radio frequency (RF) bandwidth using pseudonoise (PN) sequences. More specifically, mobile subscriber terminals ("mobiles") in a CDMA system are each assigned a unique PN sequence and combine a communication signal, such as voice, data, and control signals, with their assigned PN sequence to distinguish their transmissions from those of other mobiles. The intended receiver removes the PN sequence to "despread" the received signal and recover the transmitted communication signal.

By using the same RF bandwidth for a number of CDMA signals, each transmitting mobile will cause a degree of interference for other mobiles, thereby affecting the base stations ability to adequately serve a large number of mobiles anid, thus, limiting a base station's service capacity. To increase service capacity while ensuring adequate call quality, CDMA systems typically utilize reverse link (mobile transmitting to base station) power control techniques to adaptively set the transmit power of each mobile being served to the minimum level needed to maintain adequate performance. More specifically, a base station compares reverse link call quality (typically represented as the ratio of energy per bit, $E_b$, to interference, $N_o$) for each mobile being served with a target quality value, and generates either a power up-adjust or down adjust command at predetermined intervals (e.g., every 1.25 milliseconds), depending on whether reverse link call quality is above or below a target level.

Although a base station can thereby control the transmit power for each mobile being served to increase capacity, RF signals from other sources in the network service area may create uncontrollable interference. As a result of such uncontrollable interference sources, an affected base station may be forced to generate power up-adjust commands to maintain adequate call quality for served mobiles. If a substantial number of mobiles increase their transmit power, the base station will experience a sharp increase in interference, thereby, forcing the base station to generate even more power up-adjust commands. As a result, certain mobiles, particularly those at cell/sector boundaries, will not be able to transmit at the power level needed to overcome the resulting rise in interference, thereby causing the base station to drop these mobiles (i.e., temporarily decreasing the size of the base station's service area).

An interfering RF signal source that causes the above-described problem may be a nearby mobile that is not being served by ("not in handoff with") the affected base station. This condition is commonly referred to as "reverse link other cell interference," and would most commonly occur when the affected base station's forward link (base station transmitting to mobile) coverage is significantly less than its reverse link coverage, and if the interfering mobile is stationary. These differences between forward and reverse link coverage may be caused by various RF network conditions, such as frequency-specific interference (i.e., interference present on the base station's transmission frequency but not present on the mobile's transmission frequency) and frequency-specific fading (i.e., fading that occurs on the base station's transmission frequency but does not occur on the mobile's transmission frequency), by which the mobile does not "hear" the pilot signal transmitted by the affected base station, or at least does not pick up a strong pilot signal from the affected base station. For a stationary mobile, large differences between forward and reverse link coverage may persist for long periods.

SUMMARY OF THE INVENTION

The present invention is a method and an apparatus for identifying reverse link other cell interference in a wireless communications network and for determining whether a handoff to an affected base station should occur. In one embodiment, the present invention detects an increased interference condition in a CDMA-based wireless network, determines whether the cause of increased interference is a nearby mobile which is not in handoff with the affected base station, and selectively triggers a handoff to the affected base station when the interfering mobile can be adequately served by the affected base station.

In one exemplary implementation, a base station of a CDMA wireless network continuously monitors reverse link interference levels, e.g., based on receive signal strength indicator (RSSI) measurements, to detect an increased interference condition. Upon detecting an increased interference condition, the affected base station initiates an "other cell interference identifying" sequence to determine whether the interfering signal source is a proximate mobile being served by a neighboring base station of the CDMA wireless network. More specifically, the affected base station obtains a list of PN sequences for mobiles being served by neighboring base stations, and instructs at least one receiver unit, called a CDMA locate radio (CLR), to sequentially despread received signals using each of the PN sequences in the list of PN sequences. When the CLR detects a signal transmitted by a non-served mobile, the base station analyzes reverse link call quality for the non-served mobile to determine whether the non-served mobile is likely the source of interference.

Having determined that a nearby CDMA mobile is the source of interference, the affected base station may take one of a number of possible actions. First, the affected base station requests, via the mobile telephone switching office (MTSO) and the base station serving the interfering mobile ("the serving base station"), that the interfering mobile indicate whether the affected base station is a candidate for serving the interfering mobile. If the affected base station is a candidate for serving the interfering mobile, the affected base station can be promoted to the interfering mobile's "active set" (i.e., the mobile can select the affected base station to provide service), and an inability of the affected base station to control the transmit power of the interfering mobile may negatively affect the service quality provided by the affected base station, the interfering mobile is forced to handoff to the affected base station. After handoff, the affected base station can control the interfering mobile's transmit power level. If the affected base station is not a suitable candidate for serving the interfering mobile or if the affected base station cannot otherwise be promoted to the interfering mobile's active set (e.g., if the interfering mobile's active set is full), the affected base station may request that the interfering mobile be moved to a different frequency carrier or dropped if the interference problem is severe enough to preserve overall network performance. Furthermore, if the interfering mobile is not moved to a different frequency carrier or dropped, the affected base station may merely record the interference condition to aid future network analysis, design, and/or modifications.

BRIEF DESCRIPTION OF THE DRAWINGS

The present invention will become more fully understood from the detailed description given hereinbelow and the accompanying drawings, wherein:

FIG. 3 is a flow diagram illustrating a reverse link other cell interference identifying technique according to an embodiment of the present invention.

DETAILED DESCRIPTION

The present invention is a method and apparatus for identifying reverse link other cell interference in a wireless communications network. In one embodiment, the present invention is an apparatus/method which detects an increased interference condition in a CDMA-based wireless network, determines whether the cause of increased interference is a mobile being served by a neighboring base station, and, if so, determines whether a handoff to the affected base station can/should occur so that the affected base station can control the transmit power of the interfering mobile. An embodiment of the present invention will be described with reference to FIGS. 1–3.

Figure 1:
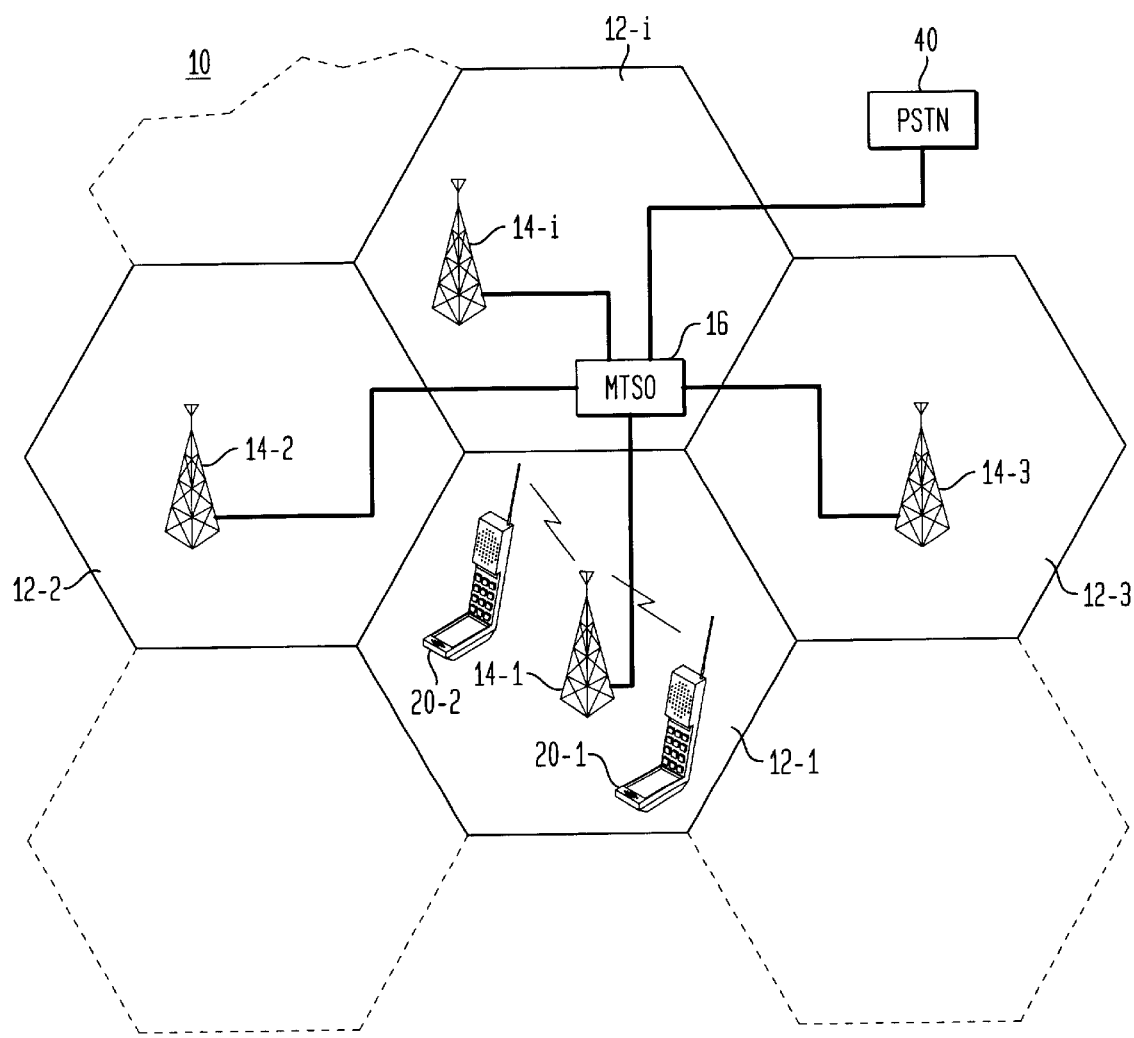
FIG. 1 illustrates, an exemplary cell pattern layout for a wireless communications network suitable for implementing embodiments of the present invention.

FIG. 1 illustrates an exemplary wireless communications network layout suitable for implementing embodiments of the present invention. As is known in the art of wireless communications, wireless networks typically rely on relatively short-range transmitter/receiver ("transceiver") base stations, each connected to a switching center (also known as a mobile telephone switching office), to serve mobiles in small regions ("cells") of a larger service area. By dividing a service area into small cells with limited-range transceivers, mobile terminals that consume relatively little power can be used to communicate with a serving base station (because transmissions from the mobile terminals only have to travel a relatively short distance), and spectral efficiency can be increased (because the same frequencies can be reused for geographically separated cells in the network region). As shown in FIG. 1, a wireless network configuration 10 includes a plurality of cells 12-1, . . . , 12-i, each having a corresponding base station 14-1, . . . , 14-i for providing communication service to mobiles located therein, such as mobiles 20-1 and 20-2 located in cell 12-1. Each of the base stations 14-1, . . . , 14-i is connected (e.g., via a trunk line) to a mobile telephone switching office (MTSO) 16. The MTSO 16 manages communication within the network, and serves as an interface between the wireless network and the Public Switched Telephone Network (PSTN) 40.

As will be apparent to those skilled in the art, numerous variations of the wireless network configuration 10 illustrated in FIG. 1 are possible. For example, each of the cells 12-1, . . . , 12-i may be sub-divided into a number of sectors. Furthermore, although the cells 12-1, . . . , 12-i are shown as hexagonal-shaped areas, different cell shapes are possible.

Figure 2:
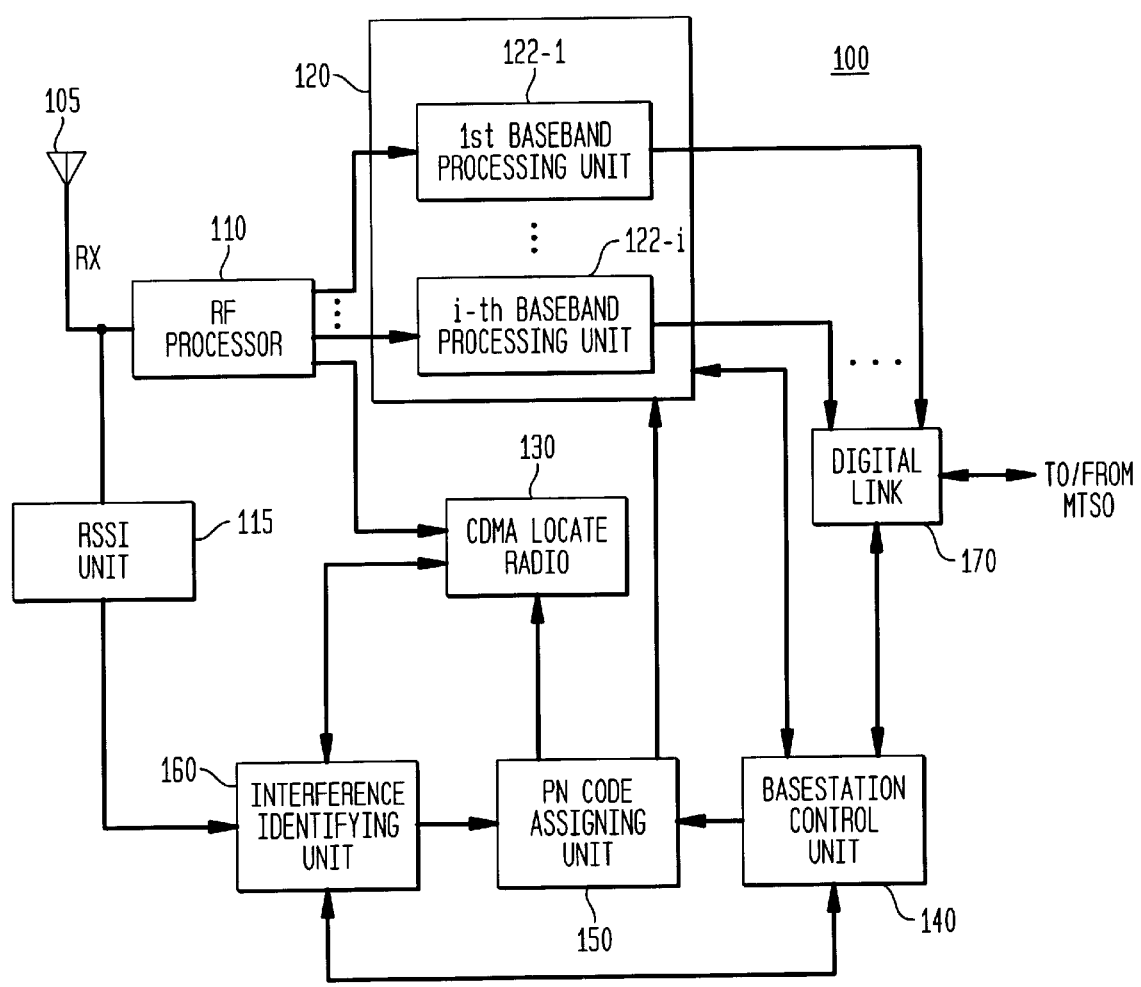
FIG. 2 is a block diagram illustrating select components of a base station receiver configuration according to an embodiment of the present invention.

FIG. 2 is, a block diagram illustrating select components of a base station receiver suitable for implementing the principles of the present invention. As shown in FIG. 2, a base station receiver 100 includes an RF processor 110, a receive signal strength indicator (RSSI) unit 115, a baseband processor 120, a CDMA locate radio (CLR) 130, a base station control unit 140, a PN code assigning unit 150, an interference identifying unit 160, and a digital link 170.

The RF processor 110 is connected to an antenna 105 to receive and process an RF signal, Rx, for example using RF processing techniques typically applied by a base station of a wireless network such as low-noise amplification, band-pass filtering to filter out frequencies above and below the base station's assigned receive bandwidth, down-conversion from RF-to an intermediate frequency (IF), and analog-to-digital conversion to generate a digital baseband signal.

The baseband processor 120 includes a plurality of baseband processing units 122-1, . . . , 122-i that each receive the digital baseband signal output by the RF processor 110. Each of the baseband processing units 122-1, . . . , 122-i is assigned to recover communication signals transmitted by a particular mobile being served by the base station receiver 100.

As is known to the art of wireless communications, digital baseband communication signals to be transmitted by a mobile in a standard CDMA network are digitally processed before being combined with an RF carrier which is radiated by the mobile's antenna. More specifically, a digital baseband communication signal, for example having a nominal data rate of 9600 bps, is error correction coded by a convolutional encoder to produce 28,800 binary symbols per second. The convolutional encoder output is then block interleaved to protect against the effects of fading, and grouped into six symbol characters, (i.e., $2^6$ possible characters) which are replaced by a corresponding 64-chip Walsh Code thereby resulting in a chip rate of 307,200 chips per second. The resulting Walsh chips are combined with a unique user PN sequence ("long code mask") assigned to the mobile. The resulting digitally processed signal is filtered and combined with the RF carrier for transmission.

Therefore, for implementation in a standard CDMA wireless system, each baseband processing unit 122-1, . . . , 122-i performs a corresponding sequence of digital processing operations to recover the communication signal transmitted by the corresponding mobile. More specifically, each baseband processing unit 122-1, . . . , 122-i despreads the digital baseband signal received from the RF processor 110 using the long code mask for the mobile assigned to the particular baseband processing unit. The baseband processor 120 is connected to the PN code assigning unit 150 to receive the long-code masks to be used by each of the plurality of baseband processing units 122-1, . . . , 122-i in accordance with control signals output by the base station control unit 140 to the PN code assigning unit 150. In accordance with the present invention, the CLR 130 also receives the digital baseband signal output by the RF processor 110 and long code masks from the PN code assigning unit 150 to identify reverse link other cell interference in a manner discussed in detail below. After despreading, baseband processing units 122-1, . . . , 122-i, perform demodulation, block de-interleaving, and error correction to recover the original communication signal transmitted by the assigned mobile.

A CDMA base station typically utilizes rake receivers, each assigned to receive from a different mobile served by the base station. As is well known, a single rake receiver includes a plurality of "fingers," which independently process the digital baseband signals output by an RF processing section. By combining the results of multiple fingers, the rake receiver achieves diversity gain to mitigate against fading effects caused by mobility and the wireless network environment. For example, to exploit the fact that a base station antenna will typically receive multiple versions of the same RF signal transmitted from a mobile, each version having a different propagation delay (i.e., "multipath"), a rake receiver controller may assign each finger to process and demodulate a different multipath and combine results from multiples fingers, thereby achieving path diversity to enhance receiver performance. In accordance with implementation in a standard CDMA system, each of the individual baseband processing units 122-1, . . . , 122-i and the CLR 130 may be a rake receiver having a plurality of fingers.

The digital link 170 transmits the retrieved communication signal output by each baseband processing unit 122-1, . . . , 122-i to the MTSO 16. Depending on the type of transmission line between the digital link 170 and the MTSO 16, the digital link 170 may utilize time division multiplexing to transmit the signals output by the baseband processing units 122-1, . . . , 122-i to the MTSO 16 The digital link 170 further acts as an interface between the base station control unit 140 and the MTSO 16 so that the base station control unit 140 and the MTSO 16 can exchange information needed to manage the wireless network and control handoffs.

As shown in FIG. 2, the interference identifying unit 160 is connected to the RSSI unit 115, the CLR 130, the PN code assigning.unit 150, and the base station control unit 140 to control a reverse link "other cell interference identifying" operation in a manner discussed in detail below.

The operation of reverse link other cell interference identification according to an embodiment of the present invention will next be described with reference to the flow diagram of FIG. 3.

Initially, the interference identifying unit 160 monitors interference levels at the base station 100 (step 202), for example by obtaining RSSI measurements from the RSSI unit 115, and determines whether interference at the base station receiver 100 exceeds a threshold (step 204). When the interference level exceeds a threshold, the interference identifying unit 160 next attempts to determine whether the source of interference is a nearby mobile which is not in handoff with the base station receiver 100 (i.e., the interfering signal source corresponds to reverse link other cell interference).

More specifically, the interference identifying unit 160 obtains a list of long code masks for mobiles being served by neighboring base stations (step 206). The interference identifying unit 160 may obtain this list of long code masks by polling each neighboring base station. Upon receiving the list of long code masks for mobiles being served by neighboring base stations, the interference identifying unit 160 instructs the PN code assigning unit 150 to sequentially assign each of the listed long code masks to the CLR. 130 so that the CLR 130 sequentially despreads the digital baseband signal received from the RF processor 110 using each of the long code masks to recover communication signals from each of the mobiles being served by neighboring base stations (step 208).

When the CLR 130 detects a signal transmitted by a non-served mobile, the interference identifying unit 160 determines whether the non-served mobile is likely the source of interference. This determination may be based on the fraction of total signal strength received by the base station that can be attributed to the non-served mobile. For example, if the Ec/Io (i.e., the ratio of energy per chip for the signal received from the non-served to total power) is larger than that for a typical user, the non-served mobile may be considered to be a significant source of interference. Measuring (or deriving) Ec/Io is a common way of expressing the relative strength of a received signal. An Ec/Io measurement made by the affected base station for a typical mobile may indicate that the signal received from the mobile accounts for approximately 2% of the total receive signal power, whereas the signal received from a significant interference source may account for greater than 5% of total receive signal power. Thus, the interference identifying unit 160 may use Ec/Io measurements (or some other measurement that can be used to derive the relative strength of the signal received from the non-served mobile) to determine whether the non-served mobile is likely the source of interference (step 210). Reverse link other cell interference most commonly occurs when RF network conditions cause the affected base station's forward link (base station transmitting to mobile) coverage to be significantly less than its reverse link coverage, and when the interfering mobile is stationary.

Having determined that a mobile served by a neighboring base station is the source of interference, the interference identifying unit 160 determines whether the interfering mobile is suitable for handoff (step 212). As is well known, a mobile in a CDMA network repeatedly searches for and detects pilot signals transmitted from network base stations. The relative strengths of the received pilot signals are used by the mobile to determine which base station should handle call traffic and control handoffs between base stations as the mobile moves through the network area. To facilitate handoff control, the mobile monitors pilot signal strength for base station(s) currently serving the mobile (i.e., base station(s) in the "active" set) as well as base stations that may be suitable for subsequently serving the mobile (i.e., base stations in the "candidate" set). Therefore, the interference identifying unit 160 may request via the MTSO 16 and the base station serving the interfering mobile, that the interfering mobile indicate whether the affected base station is in the interfering mobile's candidate set and whether the mobile has an available opening in its active set. If so, and if the affected base station determines that its inability to control the transmit power of the interfering mobile may negatively affect service quality, the affected base station requests via the MTSO 16 and the serving base station that the interfering mobile initiate a handoff to the affected base station (step 214) (i.e., promote the affected base station from the "candidate" set to the "active" set). After the handoff, the affected base station can control the transmit power level of the interfering mobile, through the reverse power control function.

If handoff to the affected base station is not possible, for example if the affected base station is not part of the mobile's "candidate" set, the affected base station determines may attempt to resolve the interference condition in another manner. More specifically, the affected base station may request that the interfering mobile be required to switch to a different frequency carrier or be dropped (step 216), for example depending on the severity of the interference and cell load. More specifically, interference at a network base station increases with increased reverse link load levels and must be maintained below a certain threshold to ensure adequate service quality. At high load levels, the substantial interference which is likely to occur at the base station may cause unstable network conditions, resulting in dropped calls, because mobiles at the cell boundaries may not be able to transmit at high enough power to be heard at the base station. Therefore, if the load level for the cell serviced by the affected base station is near or approaching a load level which will result in network instability, the affected base station may request that the MTSO 16 instruct the serving base station to move the interfering to a different frequency carrier (if possible) or drop the interfering mobile (step 218).

If the load for the cell serviced by the affected base station is relatively low, such that it is not necessary to move the interfering mobile to a different frequency carrier or drop the interfering mobile, the interference condition may at least be recorded by the affected base station or the MTSO 16 (step 220) so that the interference condition may be considered during subsequent system analysis/design/modification. The interference condition can also be recorded when the interference identifying unit 160 is unable to determine that the interference condition is attributable to a mobile being served by a neighboring base station, thereby clearly identifying the interfering signal source as external interference instead of other cell interference.

It should be apparent to those skilled in the art that various modifications and applications of the present invention are contemplated which may be realized without departing from the spirit and scope of the present invention. For example, although several measures that a base station may take to address other cell interference conditions have been specified above, it should be recognized that there are other possibilities. For example, as an alternative to forcing the interfering mobile to handoff to the affected base station, forcing the interfering mobile to handoff to some other proximate base station may mitigate the interference condition. Furthermore, although it has been assumed above that the interfering mobile can be forced to handoff to the affected base station only when the interfering mobile has an opening in its active set, the interfering mobile can be forced to substitute the affected base station for a base station that is already in the active set (i.e., swapping a base station out of a full active set to make room for the affected base station) if handoff to the affected base station would provide adequate forward link and reverse link communication.

Still further, although the exemplary base station configuration illustrated in FIG. 2 has the CLR 130 as a discrete element, the functionality of the CLR 130 may instead be provided in one or more of the baseband processing units 122-1, . . . , 122-i. In this way, the principles of the present invention may be implemented by updating the software of one or more existing baseband processing units instead of requiring additional hardware. Furthermore, by providing multiple baseband processing units with CLR capability, the time required to identify a non-served mobile that is a significant source of interference may be shortened, depending on the number of otherwise-idle baseband processing units that can be used to identify the interference source. It should also be recognized that the above-described principles can be applied to sectorized cell configurations so that interference conditions can be monitored to force handoff between sectors in addition to base station-to-base station handoffs.

What is claimed is:

1. A method of identifying an interference source in a wireless network, comprising:

detecting an increased interference condition at a network base station;

determining whether a mobile not being served by the network base station is causing the increased interference condition; and identifying the mobile causing the increased interference condition when said determining step indicates that a mobile not being served by the network base station is causing the increased interference condition.

2. The method of claim 1, wherein said step of determining whether a mobile not being served by the network base station is causing the increased interference condition includes:

obtaining a plurality of spread codes respectively associated with mobiles being served by neighboring base stations;

detecting signals from the mobiles being served by neighboring base stations using the plurality of spread codes; and observing relative strength measurements of signals detected from the mobiles being served by neighboring base stations to determine which, if any, is causing the increased interference condition.

3. The method of claim 2, wherein the plurality of spread codes are long code masks.

4. The method of claim 1, further comprising:

selectively initiating a handoff for the mobile identified as causing the increased interference condition.

5. The method according to claim 4, wherein the handoff transfers the mobile to the affected base station.

6. The method of claim 4, wherein the handoff transfers the mobile to a base station other than the affected base station.

7. The method of claim 1, further comprising:

determining whether the mobile causing the increased interference condition can be served by the base station experiencing the increased interference condition; and selectively moving the identified mobile to a different frequency carrier when the identified mobile cannot be served by the base station experiencing the increased interference condition.

8. The method of claim 1, further comprising:

determining whether the mobile causing the increased interference condition can be served by the base station experiencing the increased interference condition; and selectively dropping service to the identified mobile when the identified mobile cannot be served by the base station experiencing the increased interference condition.

9. The method of claim 1, further comprising:

determining whether the mobile causing the increased interference condition can be served by the base station experiencing the increased interference condition;

determining whether the identified mobile should be move to a different frequency carrier;

determining whether service to the identified mobile should be dropped; and recording the increased interference condition.

10. The method of claim 1, wherein the wireless communications network is a Code Division Multiple Access (CDMA) network.

11. The method according to claim 1, wherein said step of identifying the mobile causing the increased interference condition is performed by an otherwise idle baseband processing unit of a network base station.

12. An apparatus for identifying an interference source in a wireless network, comprising:

means for detecting an increased interference condition at a network base station;

means for determining whether a mobile that is not being served by the network base station is causing the increased interference condition; and means for identifying the mobile causing the increased interference condition when said means for determining indicates that a mobile not being served by the network base station is causing the increased interference condition.

13. The apparatus of claim 12, wherein said means for determining determines whether a mobile that is not being served by the base station is causing the increased interference condition by obtaining a plurality of spread codes respectively associated with mobile terminals being served by neighboring base stations, detects signals from the mobile terminals being served by neighboring base stations using the plurality of spread codes, and observing relative strength measurements of signals detected from the mobiles being served by neighboring base stations to determine if such a mobile is causing the increased interference condition.

14. The apparatus of claim 13, wherein the plurality of spread codes are long code masks.

15. The apparatus of claim 12, further comprising: means for initiating a handoff for the mobile identified by said means for identifying as causing the increased interference condition.

16. The apparatus of claim 15, wherein said means for initiating a handoff initiates a hand off of the identified mobile to the base station that is affected by the increased interference condition, thereby allowing the base station that is affected by the increased interference condition to control the identified mobile's transmit power.

17. The apparatus of claim 15, wherein said means for initiating a handoff initiates a handoff of the identified mobile to a base station other than the base station that is experiencing the increased interference condition.

18. The apparatus of claim 12, further comprising:

means for determining whether the mobile causing the increased interference condition can be served by the base station experiencing the increased interference condition.

19. The apparatus of claim 12, further comprising:

means for recording the increased interference condition.

20. The apparatus of claim 12, wherein the wireless communications network is a Code Division Multiple Access (CDMA) network.

21. The apparatus of claim 12, wherein said means for identifying the mobile causing the increased interference condition is an otherwise-idle baseband processing unit of a network base station.

22. An apparatus for identifying an interference source in a wireless network, comprising:

an interference identifying unit for detecting an increased interference condition at a network base station and determining whether a mobile that is not being served by the network base station is causing the increased interference condition; and a locate radio for detecting signals transmitted by at least one mobile that is not being served by the network base station, said interference identifying unit determining whether a mobile that is not being served by the network base station is causing the increased interference condition based on signals detected by said locate radio and identifying the mobile causing the increased interference condition.

23. The apparatus of claim 22, wherein said interference identifying unit determines whether a mobile that is not being served by the base station is causing the increased interference condition by obtaining a plurality of spread codes respectively associated with mobile terminals being served by neighboring base stations, instructing said locate radio to detect signals from the mobile terminals being served by neighboring base stations using the plurality of spread codes, and observing relative strength measurements of signals detected by said locate radio from the mobiles being served by neighboring base stations to determine if such a mobile is causing the increased interference condition.

24. The apparatus of claim 23, wherein the plurality of spread codes are long code masks.

25. The apparatus of claim 22, wherein said interference identifying unit initiates a handoff for the mobile that has been identified as causing the increased interference condition.

26. The apparatus of claim 25, wherein said interference identifying unit initiates a handoff of the identified mobile to the base station that is affected by the increased interference condition, thereby allowing the base station that is affected by the increased interference condition to control the identified mobile's transmit power.

27. The apparatus of claim 25, wherein said interference identifying unit initiates a handoff of the identified mobile to a base station other than the base station that is experiencing the increased interference condition.

28. The apparatus of claim 22, wherein said interference identifying unit determines whether the mobile causing the increased interference condition can be served by the base station experiencing the increased interference condition.

29. The apparatus of claim 22, wherein said interference identifying unit records the increased interference condition.

30. The apparatus of claim 22, wherein the wireless communications network is a Code Division Multiple Access (CDMA) network.

31. The apparatus of claim 22, wherein said locate radio is an otherwise-idle baseband processing unit of a network base station.

* * * * *